(12) United States Patent
Yu et al.

(10) Patent No.: US 11,625,943 B2
(45) Date of Patent: Apr. 11, 2023

(54) FINGERPRINT SENSING APPARATUS

(71) Applicant: Au Optronics Corporation, Hsinchu (TW)

(72) Inventors: Jui-Ping Yu, Hsinchu (TW); Che-Wei Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/519,493

(22) Filed: Nov. 4, 2021

(65) Prior Publication Data

US 2023/0052247 A1    Feb. 16, 2023

(30) Foreign Application Priority Data

Aug. 13, 2021  (TW) .................................. 110129938

(51) Int. Cl.
*G06V 40/13* (2022.01)
(52) U.S. Cl.
CPC ................................ *G06V 40/1318* (2022.01)
(58) Field of Classification Search
None
See application file for complete search history.

(56) References Cited

U.S. PATENT DOCUMENTS

| | | | |
|---|---|---|---|
| 9,362,331 B2 | 6/2016 | Huang et al. | |
| 9,991,304 B2 | 6/2018 | Kimura et al. | |
| 2013/0120760 A1 | 5/2013 | Raguin et al. | |
| 2016/0133865 A1* | 5/2016 | Yamaguchi | H01L 51/442 257/40 |
| 2016/0293650 A1 | 10/2016 | Kimura et al. | |
| 2021/0325576 A1* | 10/2021 | Schwartz | G02B 3/0056 |

FOREIGN PATENT DOCUMENTS

TW    I641122    11/2018
TW    I652837    3/2019

* cited by examiner

*Primary Examiner* — Joseph R Haley
(74) *Attorney, Agent, or Firm* — JCIPRNET

(57) ABSTRACT

A fingerprint sensing apparatus including a first substrate, a light sensing structure, a second substrate, a lens layer, a filler, and a first light shielding layer is provided. The light sensing structure is disposed on a sensing area of the first substrate. The lens layer is disposed on the second substrate. The lens layer has multiple first convex portions and a first concave portion. The filler is disposed between the lens layer and the light sensing structure. The refractive index of the filler is greater than the refractive index of the lens layer. The first light shielding layer is disposed between the second substrate and the lens layer. A solid of the first light shielding layer overlaps the first convex portions of the lens layer. An opening of the first light shielding layer overlaps the first concave portion of the lens layer.

11 Claims, 5 Drawing Sheets

FINGERPRINT SENSING APPARATUS

CROSS-REFERENCE TO RELATED APPLICATION

This application claims the priority benefit of Taiwan application serial no. 110129938, filed on Aug. 13, 2021. The entirety of the above-mentioned patent application is hereby incorporated by reference herein and made a part of this specification.

BACKGROUND

Technical Field

The disclosure relates to a sensing apparatus, and in particular to a fingerprint sensing apparatus.

Description of Related Art

A fingerprint sensing apparatus includes an optical fingerprint sensing apparatus. The principle of the optical fingerprint sensing is as follows. A Fingerprint is formed by multiple irregular ridges and valleys. When a finger presses the fingerprint sensing apparatus, the ridges contact the fingerprint sensing apparatus, and the valleys do not contact the fingerprint sensing apparatus. The ridges directly reflect a beam to an image capturing element to form a bright area. At the same time, a beam irradiated to the valleys is reflected multiple times in the valleys before being transmitted to the image capturing element to form a dark area. In this way, the beams corresponding to the ridges and valleys of the fingerprint form light and dark stripes on a light-receiving surface of the image capturing element, and a fingerprint image is thus obtained. A user's identity may be identified by using an algorithm to calculate information corresponding to the fingerprint image. However, multiple sensing structures of the image capturing element are prone to stray light, which leads to poor image quality, affecting identity recognition of the user.

SUMMARY

The disclosure provides a fingerprint sensing apparatus with good performance.

A fingerprint sensing apparatus of the disclosure includes a first substrate, a light sensing structure, a second substrate, a lens layer, a filler, and a first light shielding layer. The first substrate has a sensing area. The light sensing structure is disposed on the sensing area of the first substrate. The second substrate is disposed opposite to the first substrate. The lens layer is disposed on the second substrate and located between the first substrate and the second substrate. The lens layer has multiple first convex portions and a first concave portion. The first concave portion is disposed between the first convex portions and connected to the first convex portions. The filler is disposed between the lens layer and the light sensing structure. A refractive index of the filler is greater than a refractive index of the lens layer. The first light shielding layer is disposed between the second substrate and the lens layer. A solid of the first light shielding layer overlaps the first convex portion of the lens layer, and an opening of the first light shielding layer overlaps the first concave portion of the lens layer.

In an embodiment of the disclosure, the aforementioned lens layer is in contact with the filler.

In an embodiment of the disclosure, the aforementioned filler has a first convex portion, which fills the first concave portion of the lens layer.

In an embodiment of the disclosure, the aforementioned filler further has multiple first concave portions, and the first convex portions of the lens layer respectively fill the first concave portions of the filler.

In an embodiment of the disclosure, the aforementioned fingerprint sensing apparatus further includes a second light shielding layer, which is disposed on the first substrate and located between the filler and the light sensing layer of the light sensing structure. The first convex portion of the filler overlaps the opening of the first light shielding layer and an opening of the second light shielding layer.

In an embodiment of the disclosure, the aforementioned first substrate further has a display area outside the sensing area, and the fingerprint sensing apparatus further includes at least one self-illuminating pixel structure disposed on the display area of the first substrate. The filler is further disposed between the second substrate and the at least one self-illuminating pixel structure.

In an embodiment of the disclosure, the aforementioned fingerprint sensing apparatus further includes multiple color filter patterns, which are disposed on the second substrate and located above the at least one self-illuminating pixel structure. The filler is disposed between the color filter patterns and the at least one self-illuminating pixel structure.

In an embodiment of the disclosure, the aforementioned fingerprint sensing apparatus further includes an anti-counterfeiting pattern, which is disposed on the second substrate and located above the light sensing structure. A material of at least a portion of the anti-counterfeiting pattern is the same as a material of at least a portion of the color filter patterns.

In an embodiment of the disclosure, the aforementioned fingerprint sensing apparatus further includes a third light shielding layer, which is disposed on the second substrate and has at least one opening which overlaps the at least one self-illuminating pixel structure. The lens layer is further disposed between the third light shielding layer and the filler. The lens layer further has multiple second convex portions and at least one second concave portion. The at least one second concave portion is disposed between and connected to the second convex portions. A solid of the third light shielding layer overlaps the second convex portions of the lens layer, and the at least one opening of the third light shielding layer overlaps the at least one second concave portion of the lens layer.

In an embodiment of the disclosure, the aforementioned filler is further disposed between the lens layer and the at least one self-illuminating pixel structure. The filler further has multiple second concave portions and at least one second convex portion. The second convex portions of the lens layer respectively fill the second concave portions of the filler. The at least one second convex portion of the filler fills the at least one second concave portion of the lens layer.

In an embodiment of the disclosure, the at least one second convex portion of the aforementioned filler overlaps the at least one self-illuminating pixel structure and the at least one opening of the third light shielding layer.

DESCRIPTION OF THE EMBODIMENTS

Figure 1:
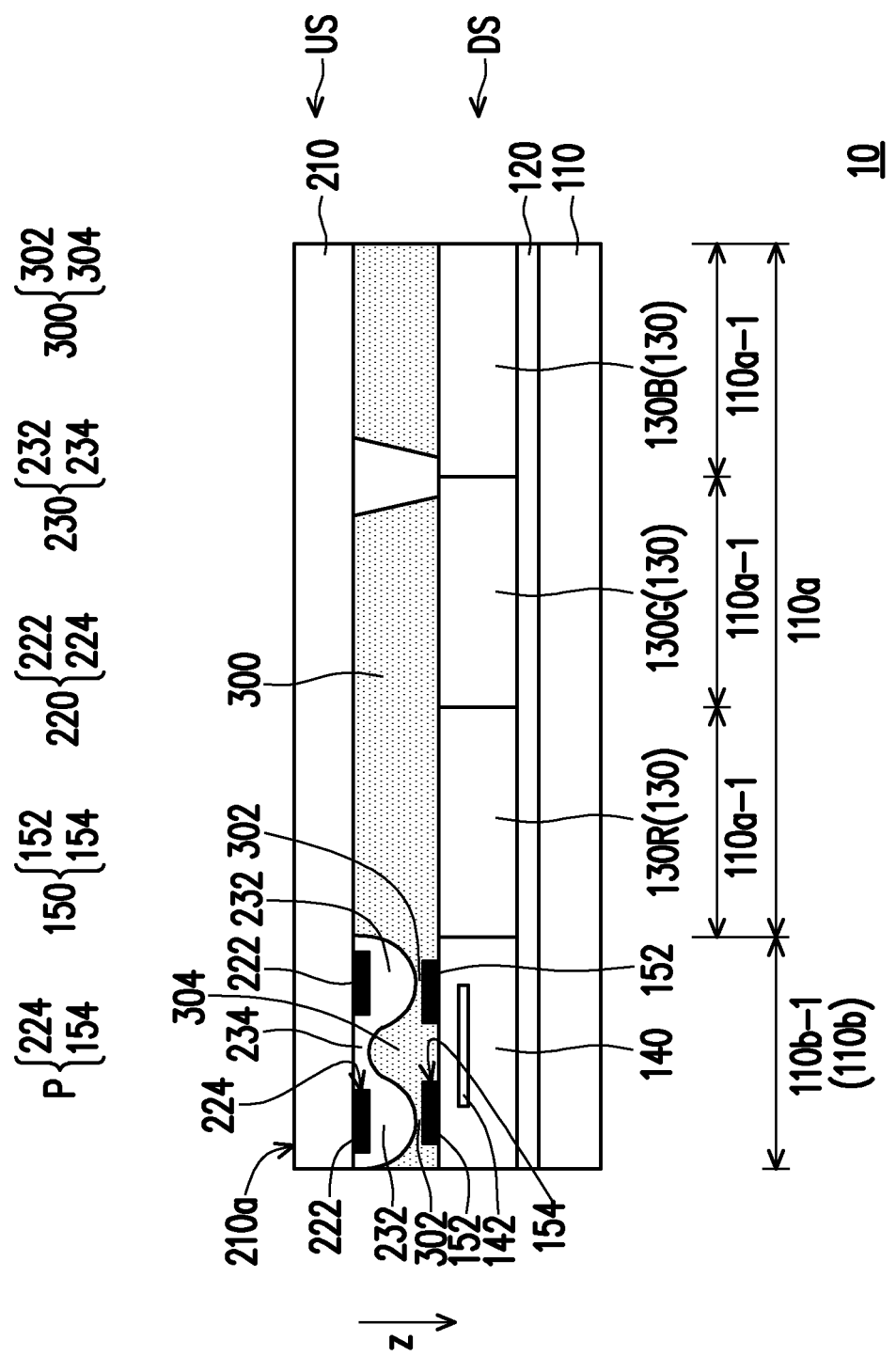
FIG. 1 is a schematic cross-sectional view of a fingerprint sensing apparatus 10 according to an embodiment of the disclosure.

Now, reference will be made to the exemplary embodiment of the disclosure in detail, and examples of the exemplary embodiment are illustrated in the accompanying drawings. Whenever possible, the same element symbols are used in the drawings and descriptions to indicate the same or similar parts.

It should be understood that when an element such as a layer, film, area or substrate is referred to as being "on" or "connected" to another element, the element may be directly on or connected to said another element, or an intermediate element may further exist. In contrast, when an element is referred to as being "directly on another element" or "directly connected to" another element, there is no intermediate element. As used herein, "connected" may refer to physical and/or electrical connection. Furthermore, "electrical connection" or "coupling" may mean that there are other elements between two elements.

As used herein, "about", "approximately", or "substantially" includes the stated value and the average value within an acceptable range of deviation from a specific value determined by a person of ordinary skill in the art, taking into account the measurement in question and the specific amount (for example, the limit of the measurement system) of errors associated with the measurement. For example, "about" may mean within one or more standard deviations of the stated value, or within ±30%, ±20%, ±10%, ±5%. Furthermore, regarding "about", "approximately" or "substantially" as used herein, a more acceptable deviation range or standard deviation may be selected based on optical properties, etching properties or other properties, and it is possible that one standard deviation may not be used for all properties.

Unless otherwise defined, all terms (including technical and scientific terms) used herein have the same meaning as commonly understood by those of ordinary skill in the art to which the disclosure belongs. It will be further understood that terms such as those defined in commonly used dictionaries should be interpreted as having a meaning consistent with their meaning in the context of the related art and the disclosure, and will not be interpreted as an idealized or excessive formal meaning, unless explicitly defined as such herein.

FIG. 1 is a schematic cross-sectional view of a fingerprint sensing apparatus 10 according to an embodiment of the disclosure.

Referring to FIG. 1, the fingerprint sensing apparatus 10 includes a first substrate 110, which has a sensing area 110b. The sensing area 110b may include a plurality of sensing pixel areas 110b-1. In this embodiment, the first substrate 110 further has a display area 110a outside the sensing area 110b. The display area 110a may include a plurality of display pixel areas 110a-1. For example, in this embodiment, the material of the first substrate 110 may be glass, quartz, an organic polymer, or an opaque/reflective material (such as a wafer, ceramic, or other applicable materials), or other applicable materials.

In this embodiment, the fingerprint sensing apparatus 10 further includes a driving circuit layer 120, which is disposed on the first substrate 110. In this embodiment, the driving circuit layer 120 may include a plurality of sensing circuits (not shown) and a plurality of pixel circuits (not shown). For example, in this embodiment, each sensing circuit may include a readout transistor (not shown), a readout wire (not shown), and a gate wire (not shown). The readout transistor has a first terminal, a second terminal, and a control terminal. The readout wire is electrically connected to the first terminal of the readout transistor, and the gate wire is electrically connected to the control terminal of the readout transistor. Each pixel driving circuit may include a display transistor, a data wire, and a gate wire. The display transistor has a first terminal, a second terminal, and a control terminal. The data wire is electrically connected to the first terminal of the display transistor, and the gate wire is electrically connected to the control terminal of the display transistor. However, the disclosure is not limited thereto.

The fingerprint sensing apparatus 10 further includes a plurality of light sensing structures 140 disposed on the sensing area 110b of the first substrate 110. For example, in this embodiment, the plurality of light sensing structures 140 are respectively disposed in the plurality of sensing pixel areas 110b-1, and each light sensing structure 140 includes a sensing pixel electrode (not shown), a light sensing layer 142 disposed on the sensing pixel electrode, and a sensing common electrode (not shown) disposed on the light sensing layer 142. The sensing pixel electrode of each light sensing structure 140 is electrically connected to the second terminal of the readout transistor of a corresponding sensing circuit, but the disclosure is not limited thereto.

In this embodiment, the fingerprint sensing apparatus 10 further includes a plurality of self-illuminating pixel structures 130. In this embodiment, each self-illuminating pixel structure 130 includes a pixel electrode, a self-illuminating layer, and a display common electrode. The current or voltage between the pixel electrode and the display common electrode is adapted for allowing the self-illuminating layer to emit light. Each pixel electrode is electrically connected to the second terminal of the display transistor of a corresponding pixel circuit. For example, in this embodiment, the self-illuminating pixel structure 130 may be an organic electroluminescent structure. However, the disclosure is not limited thereto. In other embodiments, the self-illuminating pixel structure 130 may be a micro light emitting diode (µLED) element, or other types of self-illuminating elements.

In this embodiment, the plurality of self-illuminating pixel structures 130 of the fingerprint sensing apparatus 10 may selectively include a first self-illuminating pixel structure 130R, a second self-illuminating pixel structure 130G, and a third self-illuminating pixel structure 130B, respectively adapted for emitting first color light, second color light, and third color light. In this embodiment, the first color light, the second color light and the third color light may respectively be red light, green light and blue light, but the disclosure is not limited thereto.

In this embodiment, the fingerprint sensing apparatus 10 may further selectively include a second light shielding layer 150. The second light shielding layer 150 is disposed on the sensing area 110b of the first substrate 110. The light sensing layer 142 of the light sensing structure 140 is located between the second light shielding layer 150 and the first substrate 110. The second light shielding layer 150 has a solid 152 and an opening 154. The opening 154 of the second light shielding layer 150 overlaps the photosensitive pattern 142 of the light sensing structure 140. For example, in this embodiment, the material of the second light shielding layer 150 may be a blackened metal, but the disclosure is not limited thereto.

The fingerprint sensing apparatus 10 further includes a second substrate 210, which is disposed opposite to the first substrate 110. The second substrate 210 is a light-transmitting substrate. For example, in this embodiment, the material of the second substrate 210 may be glass, quartz, an organic polymer, or other applicable materials.

The fingerprint sensing apparatus 10 further includes a first light shielding layer 220, which is disposed on the second substrate 210 and above the sensing area 110b of the first substrate 110. The first light shielding layer 220 has a solid 222 and an opening 224. The opening 224 of the first light shielding layer 220 overlaps the photosensitive pattern 142 of the light sensing structure 140. For example, in this embodiment, the material of the first light shielding layer 220 may be a blackened metal, but the disclosure is not limited thereto.

In this embodiment, an outer surface 210a of the second substrate 210 is provided for an object (for example, a fingerprint; not shown) to touch. The first light shielding layer 220 and the second light shielding layer 150 are disposed between the first substrate 110 and the second substrate 210 and are arranged in sequence along a direction z of the second substrate 210 pointing to the first substrate 110. The area of the opening 224 of the first light shielding layer 220 is larger than the area of the opening 154 of the second light shielding layer 150. A plurality of openings 224 of the first light shielding layer 220 are respectively aligned with a plurality of openings 154 of the second light shielding layer 150 to form a plurality of light tunnels P. The first light shielding layer 220 and the second light shielding layer 150 may form a light collimator. The light tunnel P formed by the opening 224 of the first light shielding layer 220 and the opening 154 of the second light shielding layer 150 may allow light reflected by the object (for example, the fingerprint) to pass through, so that the light reflected by the object may be accurately transmitted to the corresponding light sensing structure 140. The solid 222 of the first light shielding layer 220 and the solid 152 of the second light shielding layer 150 are used to block stray light, thereby improving the imaging quality of the fingerprint sensing apparatus 10.

The fingerprint sensing apparatus 10 further includes a lens layer 230, which is disposed on the second substrate 210 and located between the first substrate 110 and the second substrate 210. The first light shielding layer 220 is disposed between the second substrate 210 and the lens layer 230. The lens layer 230 has a first convex portion 232 and a first concave portion 234. The first concave portion 234 is disposed between the first convex portion 232 and connected to the first convex portion 232. The solid 222 of the first light shielding layer 220 overlaps the first convex portion 232 of the lens layer 230. The opening 224 of the first light shielding layer 220 overlaps the first concave portion 234 of the lens layer 230.

The fingerprint sensing apparatus 10 further includes a filler 300, which is at least disposed between the lens layer 230 and the light sensing structure 140. The refractive index of the filler 300 is greater than the refractive index of the lens layer 230. For example, in this embodiment, the refractive index of the filler 300 may be 1.7, and the refractive index of the lens layer 230 may be 1.5, but the disclosure is not limited thereto.

In this embodiment, the filler 300 is further disposed between the second substrate 210 and the self-illuminating pixel structure 130. Specifically, in this embodiment, the second substrate 210, the first light shielding layer 220, and the lens layer 230 may form an upper substrate US, and the first substrate 110, the driving circuit layer 120, the self-illuminating pixel structure 130, the light sensing structure 140, and the second light shielding layer 150 may form a lower substrate DS. During the manufacturing process of the fingerprint sensing apparatus 10, the filler 300 may be squeezed by a pair of upper substrate US and lower substrate DS. The lens layer 230 of the upper substrate US is in contact with the filler 300, and the filler 300 fills the gap between the upper substrate US and the lower substrate DS. However, the disclosure is not limited thereto.

In this embodiment, the filler 300 has a first convex portion 304, which fills the first concave portion 234 of the lens layer 230. The first convex portion 304 of the filler 300 is in contact with and complementary to the first concave portion 234 of the lens layer 230. The filler 300 further has a first concave portion 302, and the first convex portion 232 of the lens layer 230 respectively fills the first concave portion 302 of the filler 300. The first concave portion 302 of the filler 300 is in contact with and complementary to the first convex portion 232 of the lens layer 230.

In this embodiment, the second light shielding layer 150 is located between the filler 300 and the light sensing layer 142 of the light sensing structure 140. The first concave portion 234 of the lens layer 230 overlaps the opening 224 of the first light shielding layer 220 and the opening 154 of the second light shielding layer 150. The first convex portion 304 of the filler 300 overlaps the opening 224 of the first light shielding layer 220 and the opening 154 of the second light shielding layer 150. The solid 222 of the first light shielding layer 220 and the solid 152 of the second light shielding layer 150 cover the first convex portion 232 of the lens layer 230. The solid 222 of the first light shielding layer 220 and the solid 152 of the second light shielding layer 150 cover the first concave portion 302 of the filler 300.

It is worth mentioning that since the refractive index of the filler 300 is greater than the refractive index of the lens layer 230, light incident from the first concave portion 234 of the lens layer 230 to the first convex portion 304 of the filler 300 is deflected inwardly when passing through the interface between the lens layer 230 and the filler 300, and then concentrated on the light sensing layer 142 of the light sensing structure 140. In this way, the image capturing quality of the fingerprint sensing apparatus 10 may be improved.

It must be noted that in the following embodiment, the reference numerals and a portion of the content of the aforementioned embodiment are used, the same reference numerals are used to represent the same or similar elements, and the description of the same technical content is omitted. The aforementioned embodiment may be referred to for the description of the omitted portions, which will not be repeated in the following embodiment.

Figure 2:
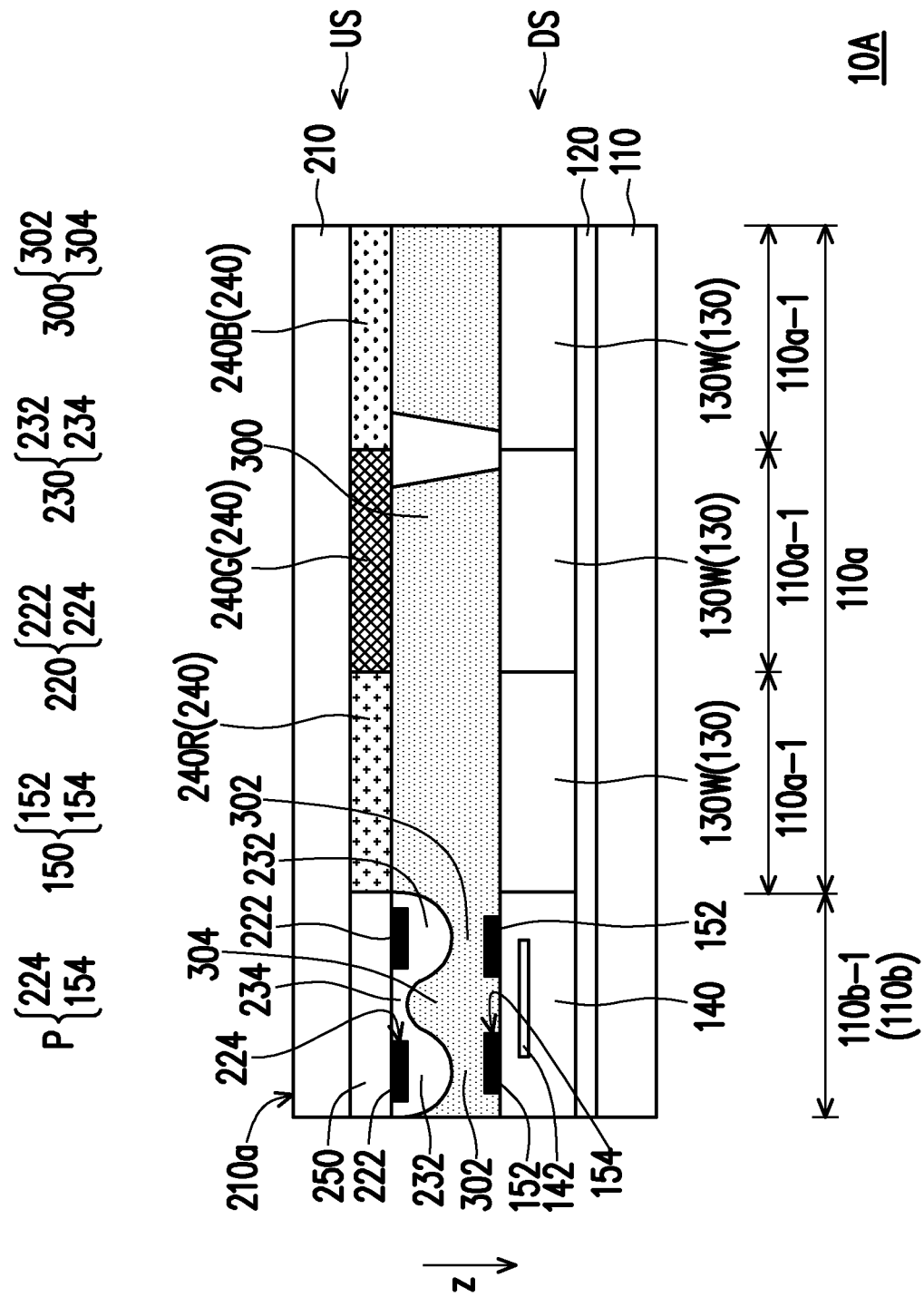
FIG. 2 is a schematic cross-sectional view of a fingerprint sensing apparatus 10A according to an embodiment of the disclosure.

FIG. 2 is a schematic cross-sectional view of a fingerprint sensing apparatus 10A according to an embodiment of the disclosure.

The fingerprint sensing apparatus 10A in FIG. 2 is similar to the fingerprint sensing apparatus 10 in FIG. 1, and the difference between the two is: a self-illuminating pixel structure 130W of FIG. 2 is different from the self-illuminating pixel structure 130 of FIG. 1, and the fingerprint sensing apparatus 10A of FIG. 2 further includes a color filter pattern 240 and an anti-counterfeiting pattern 250.

Referring to FIG. 2, specifically, in this embodiment, a plurality of self-illuminating pixel structures 130W respectively disposed in the plurality of display pixel area 110a-1 may all emit white light. The fingerprint sensing apparatus 10A further includes a plurality of color filter patterns 240, which are disposed on the second substrate 210, and are respectively located above the plurality of self-illuminating pixel structures 130W. A filler 300 is disposed between the plurality of color filter patterns 240 and the plurality of self-illuminating pixel structures 130W. The plurality of color filter patterns 240 include a first color filter pattern 240R, a second color filter pattern 240G, and a third color filter pattern 240B. A plurality of white light beams emitted by the plurality of self-illuminating pixel structures 130W may respectively pass through the first color filter pattern 240R, the second color filter pattern 240G, and the third color filter pattern 240B to form first color light, second color light, and third color light of different colors. In this embodiment, the first color filter pattern 240R, the second color filter pattern 240G, and the third color filter pattern 240B are, for example, a red filter pattern, a green filter pattern, and a blue filter pattern, respectively, and the first color light, the second color light, and the third color light are, for example, red light, green light, and blue light, respectively, but the disclosure is not limited thereto.

Figure 3:
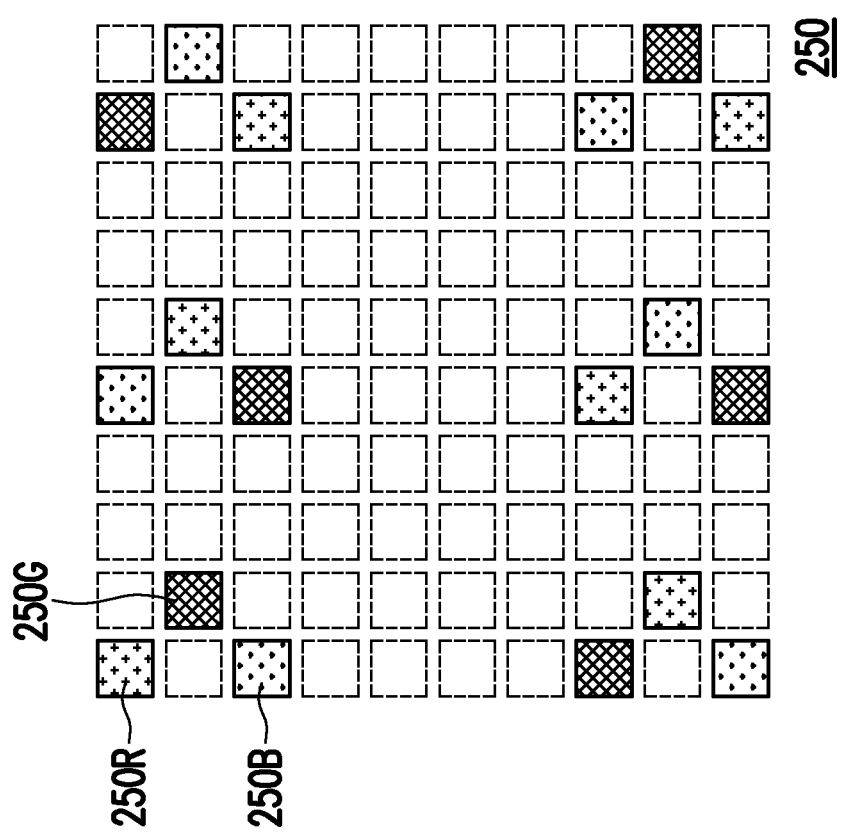
FIG. 3 is a schematic top view of an anti-counterfeiting pattern 250 according to an embodiment of the disclosure.

FIG. 3 is a schematic top view of an anti-counterfeiting pattern 250 according to an embodiment of the disclosure.

Referring to FIGS. 2 and 3, the fingerprint sensing apparatus 10A further includes an anti-counterfeiting pattern 250, which is disposed on the second substrate 210 and above the light sensing structure 140. The material of at least one portion of the anti-counterfeiting pattern 250 is the same as the material of at least one portion of the plurality of color filter patterns 240. For example, in this embodiment, the anti-counterfeiting pattern 250 includes a first anti-counterfeiting block 250R (shown in FIG. 3), a second anti-counterfeiting block 250G (shown in FIG. 3), and a third anti-counterfeiting block 250B (shown in FIG. 3). A portion of the plurality of sensing pixel areas 110b-1 overlap the first anti-counterfeiting block 250R, the second anti-counterfeiting block 250G, and the third anti-counterfeiting block 250B. The material of the first anti-counterfeiting block 250R, the material of the second anti-counterfeiting block 250G, and the material of the third anti-counterfeiting block 250B may respectively be the same as the material of the first color filter pattern 240R, the material of the second color filter pattern 240G, and the material of the third color filter pattern 240B. In other words, in this embodiment, when manufacturing the color filter pattern 240 for display, the anti-counterfeiting pattern 250 may be manufactured, too, but the disclosure is not limited thereto.

Figure 4:
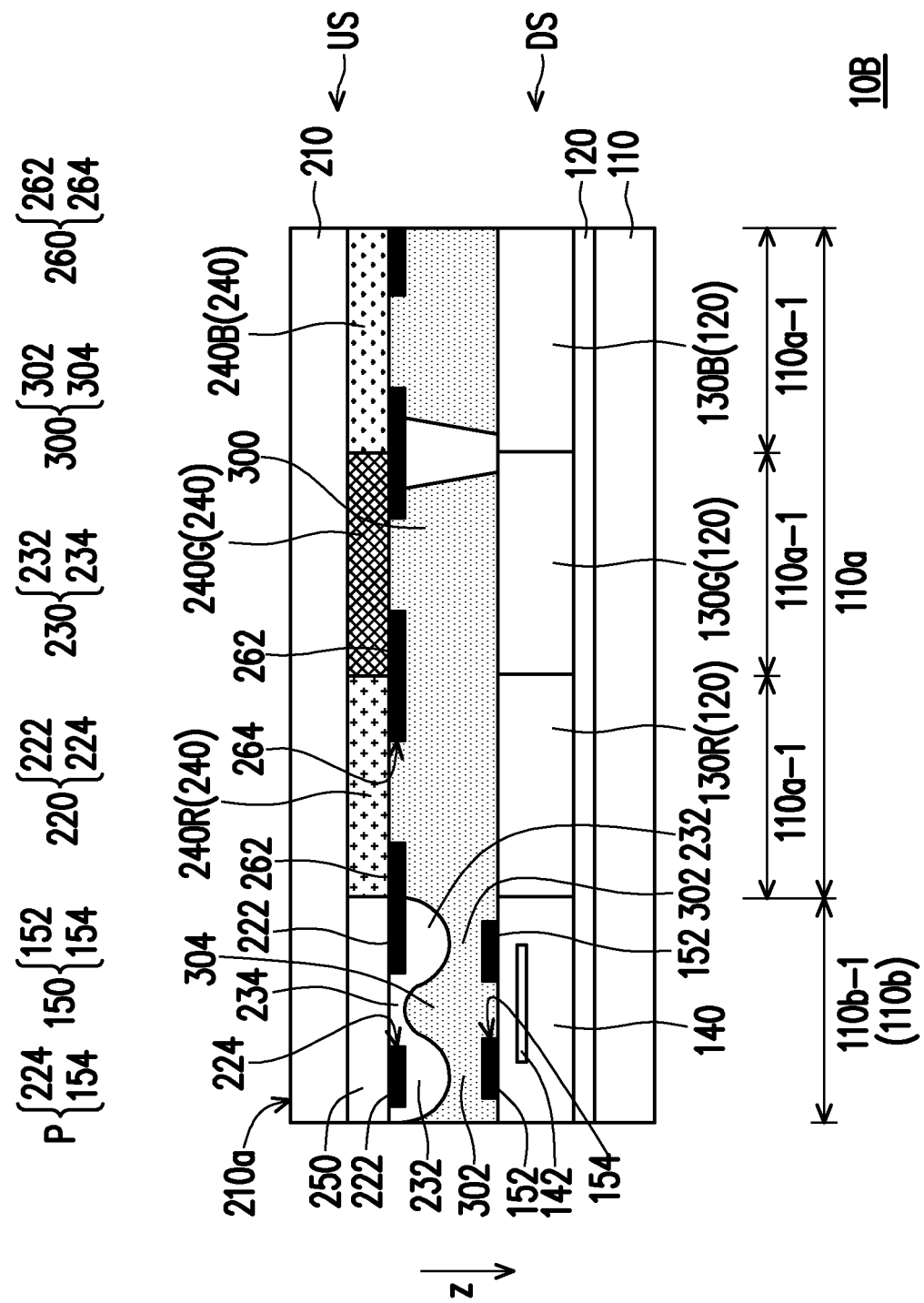
FIG. 4 is a schematic cross-sectional view of a fingerprint sensing apparatus 10B according to an embodiment of the disclosure.

FIG. 4 is a schematic cross-sectional view of a fingerprint sensing apparatus 10B according to an embodiment of the disclosure.

The fingerprint sensing apparatus 10B in FIG. 4 is similar to the fingerprint sensing apparatus 10A in FIG. 2, and the difference between the two is: the self-illuminating pixel structure 130 in FIG. 4 includes a first self-illuminating pixel structure 130R, a second self-illuminating pixel structure 130G, and a third self-illuminating pixel structure 130B respectively disposed in the plurality of display pixel areas 110a-1. The first self-illuminating pixel structure 130R, the second self-illuminating pixel structure 130G, and the third self-illuminating pixel structure 130B are respectively disposed corresponding to the first color filter pattern 240R, the second color filter pattern 240G, and the third color filter pattern 240B. In addition, the fingerprint sensing apparatus 10B further includes a third light shielding layer 260.

Referring to FIG. 4, specifically, in this embodiment, the third light shielding layer 260 is disposed on the second substrate 210. The third light shielding layer 260 has a solid 262 and an opening 264. The opening 264 of the third light shielding layer 260 overlaps the pixel electrode (not shown) of the self-illuminating pixel structure 130. The solid 262 of the third light shielding layer 260 overlaps the boundary of the plurality of display pixel areas 110a-1. In this embodiment, the third light shielding layer 260 disposed above the self-illuminating pixel structure 130 and the first light shielding layer 220 disposed above the light sensing structure 140 may belong to a same film layer, and the materials of the two are the same, but the disclosure is not limited thereto.

Figure 5:
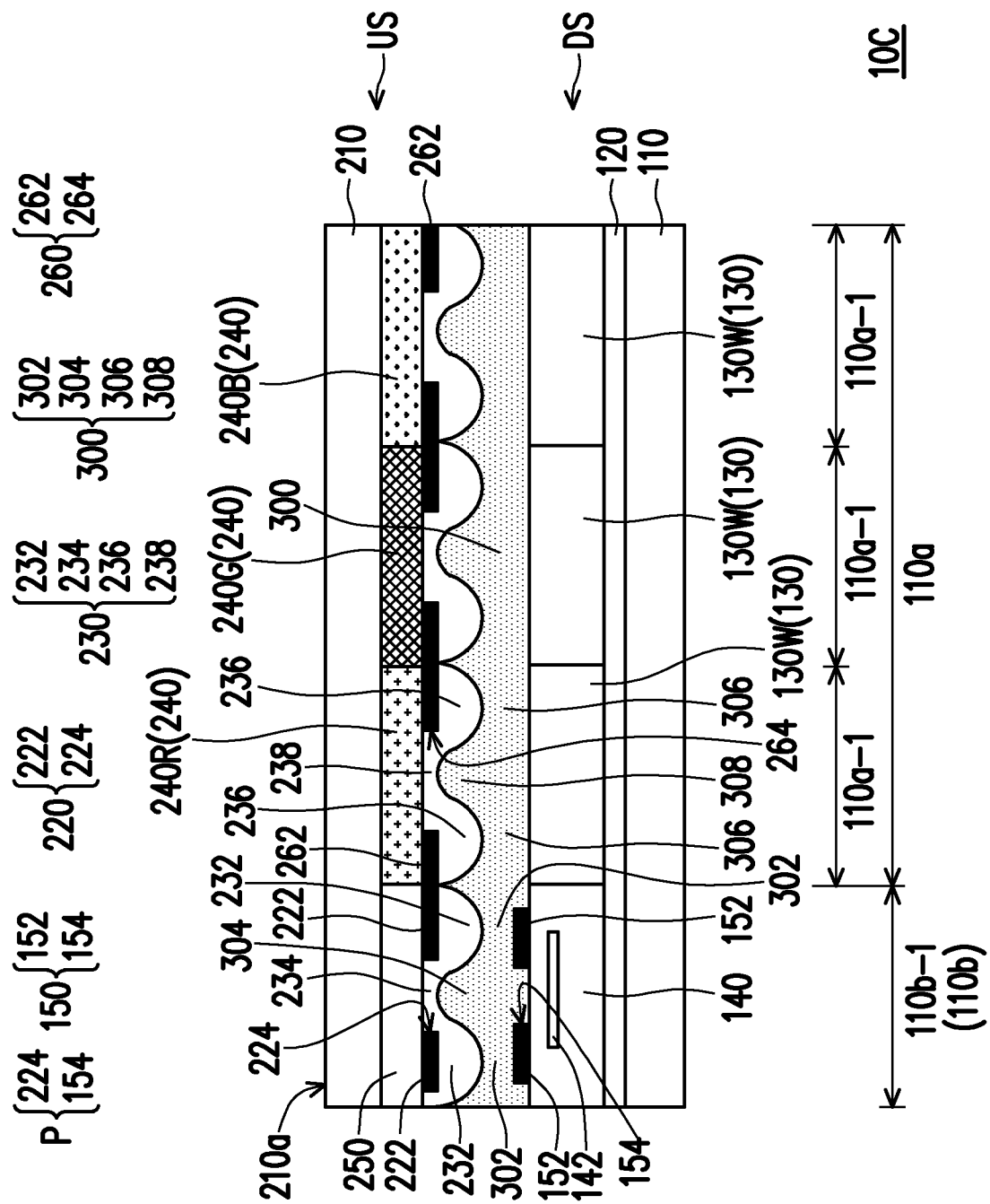
FIG. 5 is a schematic cross-sectional view of a fingerprint sensing apparatus 10C according to an embodiment of the disclosure.

FIG. 5 is a schematic cross-sectional view of a fingerprint sensing apparatus 10C according to an embodiment of the disclosure.

The fingerprint sensing apparatus 10C in FIG. 5 is similar to the fingerprint sensing apparatus 10B in FIG. 4, and the difference between the two is: the self-illuminating pixel structure 130W in FIG. 5 is different from the self-illuminating pixel structure 130 in FIG. 4, and the lens layer 230 in FIG. 5 is different from the lens layer 230 in FIG. 4.

Referring to FIG. 5, in this embodiment, a plurality of self-illuminating pixel structures 130W respectively disposed in the plurality of display pixel areas 110a-1 all emit white light. In this embodiment, the lens layer 230 is further disposed between the third light shielding layer 260 and the filler 300. The lens layer 230 further has a second convex portion 236 and a second concave portion 238, and the second concave portion 238 is disposed between the second convex portions 236 and connected to the second convex portions 236. The solid 262 of the third light shielding layer 260 overlaps the second convex portion 236 of the lens layer 230, and the opening 264 of the third light shielding layer 260 overlaps the second concave portion 238 of the lens layer 230. The filler 300 is further disposed between the lens layer 230 and the self-illuminating pixel structure 130W. The filler 300 further has a second concave portion 306 and a second convex portion 308. The second convex portions 236 of the lens layer 230 respectively fill the second concave portion 306 of the filler 300. The second convex portion 308 of the filler 300 fill the second concave portion 238 of the lens layer 230.

It is worth noting that the second convex portion 308 of the filler 300 overlaps the opening 264 of the self-illuminating pixel structure 130 and the third light shielding layer 260. Since the refractive index of the filler 300 is greater than the refractive index of the lens layer 230, light emitted by the self-illuminating pixel structure 130 is deflected inwardly when passing through the interface between the lens layer 230 and the filler 300, thereby being concentrated toward the front viewing direction. In this way, the front-view brightness of the display area 110a of the fingerprint sensing apparatus 10 may be improved.

What is claimed is:

1. A fingerprint sensing apparatus, comprising:
    a first substrate, having a sensing area;
    a light sensing structure, disposed on the sensing area of the first substrate;
    a second substrate, disposed opposite to the first substrate;
    a lens, disposed on the second substrate, located between the first substrate and the second substrate, wherein the lens has a plurality of first convex portions and a first concave portion, and the first concave portion is disposed between the first convex portions and connected to the first convex portions;
a filler, disposed between the lens and the light sensing structure, wherein a refractive index of the filler is greater than a refractive index of the lens; and
a first light shielding layer, disposed between the second substrate and the lens, wherein a solid of the first light shielding layer overlaps the first convex portions of the lens, and an opening of the first light shielding layer overlaps the first concave portion of the lens.

2. The fingerprint sensing apparatus according to claim 1, wherein the lens is in contact with the filler.

3. The fingerprint sensing apparatus according to claim 1, wherein the filler has a first convex portion, filling the first concave portion of the lens.

4. The fingerprint sensing apparatus according to claim 3, wherein the filler further has a plurality of first concave portions, and the first convex portions of the lens respectively fill the first concave portions of the filler.

5. The fingerprint sensing apparatus according to claim 3, further comprising:
a second light shielding layer, disposed on the first substrate, located between the filler and a light sensing layer of the light sensing structure, wherein the first convex portion of the filler overlaps the opening of the first light shielding layer and an opening of the second light shielding layer.

6. The fingerprint sensing apparatus according to claim 1, wherein the first substrate further has a display area outside the sensing area, and the fingerprint sensing apparatus further comprises:
at least one self-illuminating pixel structure, disposed on the display area of the first substrate, wherein the filler is further disposed between the second substrate and the at least one self-illuminating pixel structure.

7. The fingerprint sensing apparatus according to claim 6, further comprising:
a plurality of color filter patterns, disposed on the second substrate, located above the at least one self-illuminating pixel structure, wherein the filler is disposed between the color filter patterns and the at least one self-illuminating pixel structure.

8. The fingerprint sensing apparatus according to claim 7, further comprising:
an anti-counterfeiting pattern, disposed on the second substrate, located above the light sensing structure, wherein a material of at least a portion of the anti-counterfeiting pattern is the same as a material of at least a portion of the color filter patterns.

9. The fingerprint sensing apparatus according to claim 6, further comprising:
a third light shielding layer, disposed on the second substrate, having at least one opening which overlaps the at least one self-illuminating pixel structure;
wherein the lens is further disposed between the third light shielding layer and the filler, the lens further has a plurality of second convex portions and at least one second concave portion, and the at least one second concave portion is disposed between the second convex portions and connected to the second convex portions; and
a solid of the third light shielding layer overlaps the second convex portions of the lens, and the at least one opening of the third light shielding layer overlaps the at least one second concave portion of the lens.

10. The fingerprint sensing apparatus according to claim 9, wherein the filler is further disposed between the lens and the at least one self-illuminating pixel structure, the filler further has a plurality of second concave portions and at least one second convex portion, the second convex portions of the lens respectively fill the second concave portions of the filler, and the at least one second convex portion of the filler fills the at least one second concave portion of the lens.

11. The fingerprint sensing apparatus according to claim 10, wherein the at least one second convex portion of the filler overlaps the at least one self-illuminating pixel structure and the at least one opening of the third light shielding layer.

* * * * *